United States Patent
Bordeanu et al.

(10) Patent No.: US 11,447,599 B2
(45) Date of Patent: Sep. 20, 2022

(54) DUCTILE ONE-COMPONENT THERMOSETTING EPOXY COMPOSITION

(71) Applicant: SIKA TECHNOLOGY AG, Baar (CH)

(72) Inventors: Nicolae Bordeanu, Winterthur (CH); Leslie Wolschleger, Clarkston, MI (US)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 17/208,732

(22) Filed: Mar. 22, 2021

(65) Prior Publication Data
US 2021/0292470 A1    Sep. 23, 2021

(30) Foreign Application Priority Data

Mar. 20, 2020   (EP) .................................... 20164711

(51) Int. Cl.
  *C08G 59/24*   (2006.01)
  *C08G 59/40*   (2006.01)
  *C08J 9/10*    (2006.01)
  *C08L 13/00*   (2006.01)

(52) U.S. Cl.
  CPC ....... *C08G 59/245* (2013.01); *C08G 59/4021* (2013.01); *C08J 9/104* (2013.01); *C08J 2363/00* (2013.01); *C08L 13/00* (2013.01)

(58) Field of Classification Search
  CPC ........ C08J 9/104; C08J 9/0028; C08J 9/0066; C08J 9/0061; C08L 13/00
  See application file for complete search history.

(56) References Cited

U.S. PATENT DOCUMENTS

| 2002/0009582 A1 | 1/2002 | Golden |
| 2004/0204551 A1 | 10/2004 | Czaplicki et al. |
| 2004/0242802 A1* | 12/2004 | Voorheis ............ A63B 37/0003 525/386 |
| 2019/0270879 A1 | 9/2019 | Hanley |

FOREIGN PATENT DOCUMENTS

WO    2009/058295 A2    5/2009

OTHER PUBLICATIONS

Sep. 9, 2020 Search Report issued in European Patent Application No. 20 16 4711.

* cited by examiner

*Primary Examiner* — Megan McCulley
(74) *Attorney, Agent, or Firm* — Oliff PLC

(57) ABSTRACT

A one-component thermosetting epoxy resin composition, including a) at least one epoxy resin A having on average more than one epoxide group per molecule; b) at least one latent hardener for epoxy resins; c) at least one physical or chemical blowing agent BA; d) 3-15 wt.-% of at least one carboxyl group containing acrylonitrile/butadiene rubber ABR1 with a Mooney Viscosity of 15-30 MU (Mooney units), based on the total amount of epoxy resin A; and e) 3-15 wt.-% of at least one carboxyl group containing acrylonitrile/butadiene rubber ABR2 with a Mooney Viscosity of 35-50 MU (Mooney units), based on the total amount of epoxy resin A. The ratio of ABR1 to ABR2 is from 0.5-2.0. The epoxy resin adhesive is notable for the improved storage stability.

13 Claims, No Drawings

DUCTILE ONE-COMPONENT THERMOSETTING EPOXY COMPOSITION

TECHNICAL FIELD

The present invention pertains to the field of thermally expandable one-component thermosetting epoxy resin composition, in particular for the production of structural foams and a reinforcing element for hollow structures which comprise such a thermally expandable composition, a method for producing such reinforcing elements, their use for reinforcing a hollow structure and a method for reinforcing a hollow structure.

PRIOR ART

An important area of application of thermally expandable, thermosetting epoxy resin additives is found in vehicle construction, especially when foaming cavities in the body-in-white.

Manufactured products often contain openings and cavities or other hollow parts that result from the manufacturing process and/or are designed for other reasons such as weight reduction. Motor vehicles, for example, comprise several such openings and cavities in the entire vehicle, for example in the vehicle pillars.

It is often desirable to reinforce such openings and cavities with reinforcement elements built into the opening or cavity to reinforce the hollow structure of the manufactured product, for example a vehicle pillar, so that it becomes more resistant to mechanical stress, but with the advantage maintains the low weight of the hollow structure.

Such elements, which are used for the reinforcement, often consist of a carrier made of plastic, metal or another rigid material and one or more layers of an epoxy resin additive attached to it, in particular by injection molding are able to expand their volume when heat or some other physical or chemical form of energy is introduced. Such components can also consist entirely of expandable material. Using an appropriate construction, it is possible to insert the reinforcement element into the cavity of the structure to be reinforced during the manufacturing process, but at the same time to make the inner walls and/or the cavities of the structure to be reinforced accessible to liquids. For example, during the manufacturing process of a vehicle, the hollow parts of a metal frame can still be largely covered by an electro-coating liquid while the reinforcement elements are already in place. During a subsequent heat treatment step, the epoxy resin composition expands and the reinforcing element fills, or reinforces, the cavities.

For example, the document US 2004/0204551 describes a material suitable for reinforcing vehicles in the transportation industry. Said material contains an epoxy resin, a curing agent and an epoxy/elastomer adduct including an epoxy component that is at least partially reacted with an elastomer, wherein the elastomer includes a butyl nitrile rubber.

Thermally expandable epoxy resin compositions currently used often consist of solid epoxy resins. These compositions also contain blowing agents. The activation of the epoxy resin takes place under activation conditions, such as elevated temperature, while at the same time the blowing agent decomposes and releases gases such as nitrogen or carbon monoxide or physically expands. This leads to the volume expansion mentioned above and the formation of a stable foam which ideally fills the cavity as intended and adheres to its walls.

Such thermally expandable epoxy resin compositions currently have limited storage stability that is reflected in a reduction in the expansion properties upon activation conditions over time. There is a need for thermally expandable epoxy resin compositions with improved storage stability.

SUMMARY OF THE INVENTION

It is an object of the present invention, therefore, to provide thermally expandable epoxy resin compositions with improved storage stability, especially more constant expansion properties upon activation conditions after longer storage time, preferably more than 1 month.

Surprisingly it has been found that this object can be achieved by the one-component thermosetting epoxy composition as defined in Claim 1.

Further aspects of the invention are subjects of further independent claims. Particularly preferred embodiments of the invention are subjects of the dependent claims.

CERTAIN EMBODIMENTS OF THE INVENTION

The present invention therefore relates to a one-component thermosetting epoxy resin composition, comprising
 a) at least one epoxy resin A having on average more than one epoxide group per molecule;
 b) at least one latent hardener for epoxy resins; and
 c) at least one physical or chemical blowing agent BA; and
 d) 3-15 wt.-%, preferably 10-13.5 wt.-%, of at least one carboxyl group containing acrylonitrile/butadiene rubber ABR1 with a Mooney Viscosity (ML 1+4 at 100° C.) of 15-30 MU (Mooney units), more preferably 20-30 MU, based on the total amount of epoxy resin A; and
 e) 3-15 wt.-%, preferably 10-13.5 wt.-%, of at least one carboxyl group containing acrylonitrile/butadiene rubber ABR2 with a Mooney Viscosity (ML 1+4 at 100° C.) of 35-50 MU (Mooney units), more preferably 40-45 MU, based on the total amount of epoxy resin A.

The ratio of ABR1 to ABR2 is from 0.5-2.0, preferably 0.75-1.5.

The epoxy resin composition is one-component, meaning that the constituents of the epoxy resin composition, more particularly the epoxy resin and the hardener, are present in one component, without curing taking place at usual ambient temperature or room temperature. It can therefore be handled in this form, whereas with two-component systems the components cannot be mixed until immediately prior to use.

The curing of the one-component epoxy resin composition is accomplished by heating, typically at a temperature of more than 70° C., as in the range from 100 to 220° C., for example.

The prefix "poly" in expressions such as polyol or polyisocyanate denotes that the compound has two or more of the stated groups. A polyisocyanate, for example, is a compound having two or more isocyanate groups.

The expression "independently of one another" as used below means that in the same molecule, two or more identically denoted substituents may have identical or different meanings in accordance with the definition.

The dashed lines in the formulae in this document represent in each case the bond between the substituent in question and the associated remainder of the molecule.

Room temperature refers here to a temperature of 23° C., unless otherwise indicated.

The thermosetting one-component epoxy resin composition comprises at least one epoxy resin A having on average more than one epoxide group per molecule. The epoxide group is preferably in the form of a glycidyl ether group.

The fraction of the epoxy resin A having on average more than one epoxide group per molecule is preferably from 30-90 wt %, 35-85 wt %, 40-75 wt %, more preferably 45-60 wt %, based on the total weight of the one-component thermosetting epoxy resin composition.

The epoxy resin A having on average more than one epoxide group per molecule is preferably a liquid epoxy resin or a solid epoxy resin, more preferably a solid epoxy resin. The term "solid epoxy resin" is very familiar to the person skilled in the epoxide art and is used in contrast to "liquid epoxy resins". The glass transition temperature of solid resins is above room temperature, meaning that at room temperature they can be comminuted into pourable powders. It is preferred if more than 70 wt.-%, more preferred more than 80 wt.-%, more than 90 wt.-%, more than 95 wt.-%, more than 98 wt.-%, of the epoxy resin A is a solid epoxy resin.

Preferred epoxy resins have the formula (II)

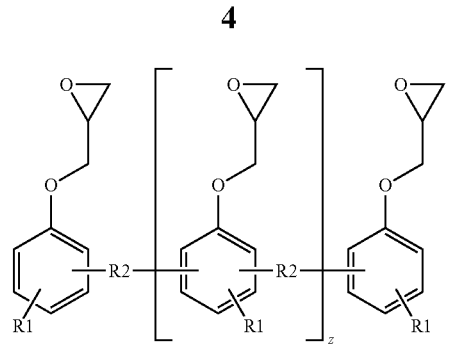

where

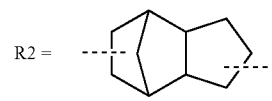

or $CH_2$, R1=H or methyl and z=0 to 7.

More particularly these are phenol-epoxy or cresol-epoxy novolacs (R2=$CH_2$).

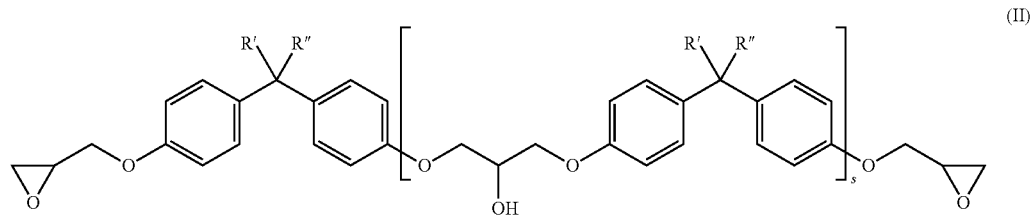

(II)

In this formula, the substituents R' and R" independently of one another are either H or $CH_3$.

In solid epoxy resins, the index s has a value of >1.5, more particularly from 2 to 12.

Solid epoxy resins of this kind are available commercially, for example, from Dow or Huntsman or Hexion.

Compounds of the formula (II) having an index s of 1 to 1.5 are referred to by the person skilled in the art as semi-solid epoxy resins. For the purposes of the present invention, they are considered likewise to be solid resins. Preferred solid epoxy resins, however, are epoxy resins in the narrower sense, in other words where the index s has a value of >1.5.

In the case of liquid epoxy resins, the index s has a value of less than 1. Preferably s has a value of less than 0.2.

The resins in question are therefore preferably diglycidyl ethers of bisphenol A (DGEBA), of bisphenol F and also of bisphenol A/F. Liquid resins of these kinds are available for example as Araldite® GY 250, Araldite® PY 304, Araldite® GY 282 (Huntsman) or D.E.R.™ 331 or D.E.R.™ 330 (Dow) or Epikote 828 (Hexion).

Of further suitability as epoxy resin A are what are called epoxy novolacs. These compounds have, in particular, the following formula:

Epoxy resins of these kinds are available commercially under the tradename EPN or ECN and also Tactix® from Huntsman, or within the product series D.E.N.™ from Dow Chemical.

The epoxy resin A is preferably a solid epoxy resin of the formula (II).

The thermosetting one-component epoxy resin composition further comprises at least one latent hardener for epoxy resins. Latent hardeners are substantially inert at room temperature and are activated by elevated temperature, typically at temperatures of 70° C. or more, thereby initiating the curing reaction. The customary latent hardeners for epoxy resins can be used. Preference is given to a latent epoxy resin hardener containing nitrogen.

The latent hardener is preferably selected from dicyandiamide, guanamines, guanidines, aminoguanidines and derivatives thereof, substituted ureas, imidazoles and amine complexes, preferably dicyandiamide.

The latent hardener is preferably used in a stoichiometric amount based on the epoxy groups in the composition. The molar ratio of the epoxy groups to the active hydrogen of the latent hardener is preferably 0.8 to 1.2, in particular 0.9 to 1.1, preferably 0.95 to 1.05.

The fraction of the latent hardener is preferably 0.1 to 15 wt %, more preferably 0.2 to 5 wt %, more particularly 0.5-3 wt %, based on the total weight of the epoxy resin composition.

The carboxyl group containing acrylonitrile/butadiene rubbers ABR1 and ABR2 contain one or more carboxyl group (e.g., carboxylic acid groups). The carboxyl group containing acrylonitrile/butadiene rubbers may also include pendant carboxy or carboxyl groups.

The carboxyl group containing acrylonitrile/butadiene rubbers ABR1 and ABR2 preferably have a carboxyl content of 0.005 equivalents per hundred rubber (EPHR) to 0.4 EPHR, more preferably from 0.01 EPHR to 0.2 EPHR and even more preferably from 0.05 EPHR to 0.1 EPHR.

For the carboxyl group containing acrylonitrile/butadiene rubbers ABR1 and ABR2, the carboxylic groups are preferably provided by a termonomer such as methacrylic acid. The carboxyl groups containing acrylonitrile/butadiene rubbers ABR1 and ABR2 preferably are acrylonitrile/butadiene/methacrylic acid rubbers.

Particularly preferred carboxyl group containing acrylonitrile/butadiene rubbers ABR1 and ABR2 are available from Nippon Zeon under the trade name Hycar, now available under the trade name NIPOL.

The carboxyl group containing acrylonitrile/butadiene rubbers ABR1 and ABR2 preferably include from 10%-50% by weight nitrile, more preferably 20%-40% by weight nitrile and even more preferably 25%-35% by weight nitrile.

The ratio of ABR1 to ABR2 is from 0.5-2.0, especially 0.75-1.5. Preferably the ratio of ABR1 to ABR2 is from 0.5-2.0, preferably 0.75-1.5, 0.8-1.25, 0.85-1.2, 0.9-1.1, most preferably 0.95-1.05.

This is beneficial to a reduced decrease in expansion properties upon activation conditions after longer storage times, preferably after storage times longer than 1 month, more preferably after storage times of 3 month, as is evident in Table 1, for example.

The Mooney viscosity refers to the viscosity measure of rubbers. It is defined as the shearing torque resisting rotation of a cylindrical metal disk (or rotor) embedded in rubber within a cylindrical cavity. The dimensions of the shearing disk viscometer, test temperatures, and procedures for determining Mooney viscosity are preferably defined in ASTM D1646 standard.

The composition contains 3-15 wt.-% of at least one carboxyl group containing acrylonitrile/butadiene rubber ABR1, based on the total amount of epoxy resin A. Preferably the amount of carboxyl group containing acrylonitrile/butadiene rubber ABR1 is 5-14 wt.-%, 7.5-13 wt.-%, 10-13.5 wt.-%, 11-13 wt.-%, most preferred 12-13 wt.-%, based on the total amount of epoxy resin A.

The composition contains 3-15 wt.-% of at least one carboxyl group containing acrylonitrile/butadiene rubber ABR2, based on the total amount of epoxy resin A. Preferably the amount of carboxyl group containing acrylonitrile/butadiene rubber ABR2 is 5-14 wt.-%, 7.5-13 wt.-%, 10-13.5 wt.-%, 11-13 wt.-%, most preferred 12-13 wt.-%, based on the total amount of epoxy resin A.

The one-component thermosetting epoxy resin composition might additionally comprise at least one toughness improver D. The toughness improvers D may be solid or liquid. More particularly the toughness improver D is selected from the group consisting of terminally blocked polyurethane polymers D1, liquid rubbers D2 and core-shell polymers D3. With preference the additional toughness improver D is selected from the group consisting of terminally blocked polyurethane polymers D1 and liquid rubbers D2. The before mentioned liquid rubbers D2 are not the same as the carboxyl group containing acrylonitrile/butadiene rubber ABR1, respectively ABR2.

The fraction of toughness improver D is preferably from 1-10 wt %, more preferably 2.5-7.5 wt %, based on the total weight of the epoxy resin composition. It can also be preferable if the epoxy resin composition contains less than 2, preferably less than 1, less than 0.5, less than 0.1, most preferably no beforementioned toughness improver D.

In one preferred embodiment, the one-component thermosetting epoxy resin composition further comprises at least one filler F. Preference here is given to mica, talc, kaolin, wollastonite, feldspar, syenite, chlorite, bentonite, montmorillonite, calcium carbonate (precipitated or ground), dolomite, quartz, silicas (fumed or precipitated), cristobalite, calcium oxide, aluminium hydroxide, magnesium oxide, hollow ceramic beads, hollow glass beads, hollow organic beads, glass beads, glass fibres and colour pigments. Particularly preferred are fillers selected from the group consisting of calcium carbonate, calcium oxide, talc, glass fibres and fumed silicas, more preferably talc, glass fibres and fumed silicas.

The total fraction of the overall filler F is advantageously 3-50 weight-%, preferably 5-40 weight-%, 8-35 weight-%, based on the total weight of the epoxy resin composition.

The one-component thermosetting epoxy resin composition may comprise further constituents, especially catalysts, stabilizers, particularly heat and/or light stabilizers, thixotropic agents, plasticizers, solvents, dyes and pigments, corrosion inhibitors, surfactants, defoamers and adhesion promoters.

The one-component thermosetting epoxy resin composition comprises at least one physical or chemical blowing agent BA.

Chemical blowing agents are organic or inorganic substances which, under the influence of temperature, humidity, electromagnetic radiation or chemicals, form or split off gaseous substances. Such substances are in particular azodicarbonamides, sulfohydrazides, hydrogen carbonates or carbonates. Compounds can be used as physical blowing agents which, for example when the temperature, pressure or volume changes, in particular when the temperature rises, change to the gaseous state of matter and thus form a foam structure through volume expansion. Such physical blowing agents are in particular liquids which evaporate at elevated temperature. Furthermore, gases or low-boiling liquids can be used as physical blowing agents, which are introduced into the composition in microencapsulated form. Both chemical and physical blowing agents are able to produce foam structures in polymer compositions.

Preferred physical blowing agents are expandable microspheres, consisting of a thermoplastic shell which is filled with thermally expandable liquids or gases. Such microspheres are commercially available, for example, under the trade name Expancel® from Akzo Nobel, the Netherlands.

The at least one physical or chemical blowing agent BA preferably has an activation temperature from 120° C. to 220° C., preferably from 140° C. to 200° C.

The proportion of the blowing agent BA is advantageously 0.1-5% by weight, preferably 0.1-3% by weight, in particular 1-2% by weight, based on the total weight of the epoxy resin composition.

The one-component thermosetting epoxy resin composition can also contain one or more additives. Examples of additives which can be used are processing aids such as waxes, antioxidants, UV stabilizers, dyes, biocides or flame retardants.

The proportion of processing aid is advantageously 1 to 8% by weight, preferably 2 to 5% by weight, based on the total weight of the composition.

The one-component thermosetting epoxy resin composition preferably has a melt flow index (MFI) of 0.5-15 g/10 min, in particular 1-10 g/10 min, preferably 1-5 g/10 min, most preferably 1-3 g/10 min.

The MFI is determined at 110° C., 2.16 kg in accordance with ASTM D1238, preferably with a melting time of 120 seconds.

The one-component thermosetting epoxy resin composition is preferably an injection moldable mixture, i.e. the mixture has a viscosity suitable for injection molding at the processing temperatures. It is particularly injection-moldable without foaming.

A particularly preferred thermosetting one-component epoxy resin composition comprises:
- 30-90 wt %, 35-85 wt %, 40-75 wt %, more preferably 45-60 wt %, based on the total weight of the one-component thermosetting epoxy resin composition, of the least one epoxy resin A having on average more than one epoxide group per molecule;
- 0.1 to 15 wt %, more preferably 0.2 to 5 wt %, more particularly 0.5-3 wt %, based on the total weight of the one-component thermosetting epoxy resin composition, of the at least one latent hardener for epoxy resins, more particularly dicyandiamide;
- 0.1-5% by weight, preferably 0.1-3% by weight, in particular 1-2% by weight, based on the total weight of the epoxy resin composition, of the blowing agent BA;
- 3-15 wt.-%, preferably 5-14 wt.-%, 7.5-13 wt.-%, 10-13.5 wt.-%, 11-13 wt.-%, most preferred 12-13 wt.-%, of at least one carboxyl group containing acrylonitrile/butadiene rubber ABR1 with a Mooney Viscosity (ML 1+4 at 100° C.) of 15-30 MU (Mooney units), more preferably 20-30 MU, based on the total amount of epoxy resin A;
- 3-15 wt.-%, preferably 5-14 wt.-%, 7.5-13 wt.-%, 10-13.5 wt.-%, 11-13 wt.-%, most preferred 12-13 wt.-%, of at least one carboxyl group containing acrylonitrile/butadiene rubber ABR2 with a Mooney Viscosity (ML 1+4 at 100° C.) of 35-50 MU (Mooney units), more preferably 40-45 MU, based on the total amount of epoxy resin A;
- preferably 5-40 weight %, preferably 20-40 weight %, based on the total weight of the epoxy resin composition, of a filler F selected from the group consisting of calcium carbonate, calcium oxide, talc, glass fibres and fumed silicas, more preferably talc, glass fibres and fumed silicas.

The ratio of ABR1 to ABR2 is from 0.5-2.0, preferably 0.75-1.5.

It may further be advantageous if the preferred one-component thermosetting epoxy resin composition consists to an extent of more than 80 weight %, preferably more than 90 weight %, more particularly more than 95 weight %, especially preferably more than 98 weight %, most preferably more than 99 weight %, based on the total weight of the epoxy resin composition, of the aforementioned constituents.

The one-component thermosetting epoxy resin composition is preferably tack-free at 23° C. The term "tack-free" is understood here to mean immediate tack or "tack", which is so low at 23° C. that when pressed with a thumb with a pressure of about 5 kg for 1 second on the surface of the one-component thermosetting epoxy resin composition, the thumb does not stick to the surface of the composition layer or the one-component thermosetting epoxy resin composition cannot be raised.

The compositions according to the present invention can be obtained by mixing the components in any suitable mixing device, e.g. In a dispersion mixer, planetary mixer, twin screw mixer, continuous mixer, extruder or twin-screw extruder.

After mixing, the resulting composition can be molded into their desired shape e.g. by extruding, blow molding, pelletizing, injection molding, compression molding, stamping or punching or any other suitable method.

The mixing of the components preferably comprises an extrusion step, the mixed and extruded composition then being granulated. The granulated composition is then preferably brought into its desired shape by injection molding.

The foaming of the one-component thermosetting epoxy resin composition is preferably carried out independently of the curing of the epoxy resin composition, in particular beforehand. As a result, the epoxy resin composition cures only when the foaming of the epoxy resin composition has largely taken place. Otherwise, the epoxy resin composition hardens before it has reached the intended place through the foaming. It is therefore preferred that the curing temperature of the epoxy resin composition is above the foaming temperature of the epoxy resin composition.

Preferably, the expandable epoxy resin compositions show the following reduction in expansion upon activation conditions after storage compared to the expansion of the expandable epoxy resin composition immediately after production of the composition (measurements as described in the experimental section):
- Expansion 25 min @150° C., 1 m.: less than 50%, preferably less than 30%, more preferably less than 25%; and/or
- Expansion 25 min @180° C., 1 m.: less than 15%, preferably less than 10%, more preferably less than 5%; and/or
- Expansion 25 min @150° C., 3 m.: less than 70%, preferably less than 60%, more preferably less than 55%; and/or
- Expansion 25 min @180° C., 3 m.: less than 60%, preferably less than 50%, more preferably less than 40%.

Another aspect of the invention are reinforcement elements comprising the one-component heat-curing epoxy resin composition, in particular for reinforcement in the cavities of structural components.

The one-component thermosetting epoxy resin composition is preferably applied or attached to a carrier part.

This carrier part can consist of any materials. Preferred materials are plastics, in particular polyurethanes, polyamides, polyesters and polyolefins, preferably high-temperature-resistant polymers such as poly (phenylene ethers), polysulfones or polyethersulfones, which in particular are also foamed; Metals, especially aluminum and steel; or any combination of these materials.

Furthermore, the carrier part can have any structure and structure. For example, it can be solid or hollow or have a lattice-like structure. The surface of the carrier part can typically be smooth, rough or structured. The carrier part can also contribute to the structural reinforcement in addition to its function as a carrier for the foamable material.

It is also possible that reinforcing elements have no carrier part and consist entirely of the one-component thermosetting epoxy resin composition.

The reinforcement elements comprising a carrier part and the one-component heat-curing epoxy resin composition are preferably produced by injection molding.

If the carrier part consists of a material that can be processed by injection molding, a two-component injection molding process is usually used. First, a first component, in this case the carrier part, is injected. After this first component has solidified, the cavity in the mold is enlarged or adapted, or the molded part is placed in a new mold, and a second component, in this case the epoxy resin composition, is molded onto the first component with a second injection unit. If the carrier part consists of a material that cannot be produced by the injection molding process, for example of a metal, the carrier part is placed in an appropriate tool and the epoxy resin composition is injection molded onto the carrier part.

Of course, there is also the possibility of fastening the epoxy resin composition to a carrier part by any other fastening means or method.

For the reinforcing elements mentioned, it is further advantageous if the epoxy resin composition can be foamed and cured thermally, at a temperature from 120° C. to 220° C., preferably from 140° C. to 200° C., preferably within a time period at said temperature of 10 to 60 min.

Furthermore, the invention comprises the use of a reinforcing element, as described above, for reinforcing cavities in structural components. Structural components of this type are preferably used in bodies and/or frames of means of transport and transportation, in particular of vehicles on water or on land or of aircraft. The invention preferably includes the use of a reinforcing element according to the invention in bodies or frames of automobiles (in particular A, B, C or D pillars) trucks, railroad cars, boats, ships, helicopters and airplanes, mostly preferably in automobiles.

A further aspect of the present invention therefore relates to a method for reinforcing structural components comprising the steps i) placing the reinforcement element in a cavity according to the previous description;

ii) heating the reinforcement element to a temperature from 120° C. to 220° C., preferably from 140° C. to 200° C., preferably for 10 to 60 min.

Preferably, step i) takes place before step ii).

The invention is elucidated further in the text below by means of examples which, however, are not intended to restrict the invention in any way.

EXAMPLES

Raw materials and test methods used for the testing of the respective properties in the examples were as follows:

| | |
|---|---|
| Solid epoxy resin | Solid epoxy resin, (bisphenol A diglycidyl ether based), Dow |
| ABR1 | Nipol 1472 X from Nippon Zeon, Mooney Viscosity (ML 1 + 4 at 100° C.) of 25 MU, Carboxyl Content 0.07-0.08 EPHR, 27% by weight nitrile. |
| ABR2 | Nipol 1472 HV from Nippon Zeon, Mooney Viscosity (ML 1 + 4 at 100° C.) of 41 MU, Carboxyl Content 0.07-0.08 EPHR, 27% by weight nitrile. |
| Glass fibers | Chopped glass fibers, Lanxess |
| Fumed Silica | Fumed Silica, Wacker |
| Talc | Clay mineral composed of hydrated magnesium silicate |
| Process wax | Luwax, ethylene homopolymer wax, BTC Europe |
| Dicy | Dicyandiamide |
| Substituted urea | Accelerator |
| Blowing agent | Chemical blowing agent, OBSH |

Raw materials used

Preparation of the Compositions

According to the information in Table 1, the reference compositions Ref. 1-Ref. 5 and the compositions E-1-E-5 according to the invention were produced. The amounts in Table 1 are in parts by weight. The raw materials used were mixed with a tumble mixer for 10 min. The mixtures were then introduced into a twin-screw extruder (Dr. Collin ZK 25 T SCD15) and compounded at a throughput of 2.5 kg per hour. The discharge took place through a 1-hole nozzle (3 mm) on a conveyor belt. The strand obtained was cooled with forced air and then granulated using the Dr. Collin granulator integrated in the system. The granules obtained were then processed into 3 mm thick sheets using a Krauss-Maffei 110t injection molding machine.

The following measurements were carried out on the test specimens obtained:

Test Methods

Melt Flow Index (MFI)

110° C., 2.16 kg according to ASTM D1238

The MFI was determined using a capillary rheometer, whereby the granules were first melted in a heatable cylinder with a melting time of 120 seconds, compressed and pressed under a pressure nozzle (weight) through a defined nozzle (2,046 mm). The emerging mass of the polymer melt was determined.

This was then weighed out on an analytical balance and the MFI was calculated using the appropriate formula (MFI=mass/10 min). The unit for the MFI is therefore given in g/10 min.

Determination of Foam Density/Volume Expansion (Expansion)

The expansion stability was tested in all samples by heat treatment of the individual samples at different temperatures (25 min at 150° C. or 25 min at 180° C.) in an oven. The temperatures, periods and extent of expansion (in % based on the original volume before expansion) are shown in Table 1.

Volume expansions were quantified for each sample by measuring the density before and after expansion. The densities were determined according to DIN EN ISO 1183 using the water immersion method (Archimedes principle) in deionized water and a precision balance to measure the mass All the compositions Ref1-Ref6 and Ex1 before expansion were tack-free at 23° C. according to the definition described above and had a MFI of 1.5 g/10 min.

TABLE 1

|  |  | Ref. 1 | Ref. 2 | Ref. 3 | E-1 | Ref. 4 | Ref. 5 | Ref. 6 |
|---|---|---|---|---|---|---|---|---|
| Ratio ABR1/ABR2 | (wt-%/wt-%) | 100/0 | 90/10 | 70/30 | 50/50 | 30/70 | 10/90 | 0/100 |
| Solid epoxy resin | [%] | 50.5 | 50.5 | 50.5 | 50.5 | 50.5 | 50.5 | 50.5 |
| ABR1/ABR2* | [%] | 12.5 | 12.5 | 12.5 | 12.5 | 12.5 | 12.5 | 12.5 |
| Glass fibres | [%] | 10 | 10 | 10 | 10 | 10 | 10 | 10 |
| Fumed Silica | [%] | 1.9 | 1.9 | 1.9 | 1.9 | 1.9 | 1.9 | 1.9 |
| Talc | [%] | 18.1 | 18.1 | 18.1 | 18.1 | 18.1 | 18.1 | 18.1 |
| Process wax | [%] | 4.1 | 4.1 | 4.1 | 4.1 | 4.1 | 4.1 | 4.1 |
| Dicy | [%] | 1.1 | 1.1 | 1.1 | 1.1 | 1.1 | 1.1 | 1.1 |
| substituted urea | [%] | 0.3 | 0.3 | 0.3 | 0.3 | 0.3 | 0.3 | 0.3 |
| Blowing agent | [%] | 1.5 | 1.5 | 1.5 | 1.5 | 1.5 | 1.5 | 1.5 |
| TOTAL | [%] | 100 | 100 | 100 | 100 | 100 | 100 | 100 |
| Expansion 25'@150° C., initial | [%] | 207 | 205 | 184 | 219 | 187 | 198 | 197 |
| Expansion 25'@180° C., initial | [%] | 219 | 228 | 184 | 225 | 219 | 224 | 232 |
| Expansion 25'@150° C., 1 m. | [%] | 132 | 109 | 87 | 169 | 106 | 110 | 104 |
| Expansion 25'@180° C., 1 m. | [%] | 158 | 134 | 101 | 216 | 129 | 131 | 123 |
| Expansion 25'@150° C., 3 m. | [%] | 72 | 54 | 49 | 104 | 57 | 63 | 64 |
| Expansion 25'@180° C., 3 m. | [%] | 87 | 75 | 59 | 145 | 79 | 78 | 75 |
| MFR 110° C./2.16 kg | [g/10 min] | 1.5 | 1.5 | 1.5 | 1.5 | 1.5 | 1.5 | 1.5 |

*the sum of ABR1 and ABR2 is shown as wt.-% based on the total composition

The invention claimed is:

1. A one-component thermosetting epoxy resin composition, comprising
    a) at least one epoxy resin A having on average more than one epoxide group per molecule;
    b) at least one latent hardener for epoxy resins; and
    c) at least one physical or chemical blowing agent BA; and
    d) 3-15 wt.-%, of at least one carboxyl group containing acrylonitrile/butadiene rubber ABR1 with a Mooney Viscosity (ML 1+4 at 100° C.) of 15-30 MU (Mooney units), based on the total amount of epoxy resin A; and
    e) 3-15 wt.-%, of at least one carboxyl group containing acrylonitrile/butadiene rubber ABR2 with a Mooney Viscosity (ML 1+4 at 100° C.) of 35-50 MU (Mooney units), based on the total amount of epoxy resin A,
    wherein the ratio of ABR1 to ABR2 is from 0.5-2.0.

2. The one-component thermosetting epoxy resin composition according to claim 1, wherein the fraction of the epoxy resin A having on average more than one epoxide group per molecule is from 30-90 wt %, based on the total weight of the one-component thermosetting epoxy resin composition.

3. The one-component thermosetting epoxy resin composition according to claim 1, wherein the epoxy resin A is a solid epoxy resin.

4. The one-component thermosetting epoxy resin composition according to claim 1, wherein the carboxyl group containing acrylonitrile/butadiene rubbers ABR1 and ABR2 have a carboxyl content of 0.005 equivalents per hundred rubber (EPHR) to 0.4 EPHR.

5. The one-component thermosetting epoxy resin composition according to claim 1, wherein the carboxyl group containing acrylonitrile/butadiene rubbers ABR1 and ABR2 include from 20% -40% by weight nitrile.

6. The one-component thermosetting epoxy resin composition according to claim 1, wherein the ratio of ABR1 to ABR2 is from 0.8-1.25.

7. The one-component thermosetting epoxy resin composition according to claim 1, wherein the latent hardener is selected from dicyandiamide, guanamines, guanidines, aminoguanidines and derivatives thereof, substituted ureas, imidazoles and amine complexes.

8. The one-component thermosetting epoxy resin composition according to claim 1, wherein the one-component thermosetting epoxy resin composition further comprises at least one filler F, selected from the group consisting of calcium carbonate, calcium oxide, talc, glass fibres and fumed silicas.

9. The one-component thermosetting epoxy resin composition according to claim 1, wherein the proportion of the blowing agent BA is 0.1-5% by weight, based on the total weight of the epoxy resin composition.

10. The one-component thermosetting epoxy resin composition according to claim 1, wherein the one-component thermosetting epoxy resin composition has a melt flow index (MFI) of 0.5-15 g/10 min, determined at 110° C., 2.16 kg in accordance with ASTM D1238.

11. The one-component thermosetting epoxy resin composition according to claim 1, wherein the one-component thermosetting epoxy resin composition is tack-free at 23° C.

12. A reinforcement element comprising the one-component heat-curing epoxy resin composition according to claim 1 for reinforcement in the cavities of structural components.

13. A method for reinforcing structural components comprising the steps
    i) placing a reinforcement element according to claim 12 in a cavity of a structural component;
    ii) heating the reinforcement element to a temperature from 120° C. to 220° C., for 10 to 60 min.

* * * * *